June 15, 1954          L. B. NEWMAN          2,680,967
APPARATUS FOR MEASURING MUSCLE STRENGTH
Filed Sept. 4, 1948
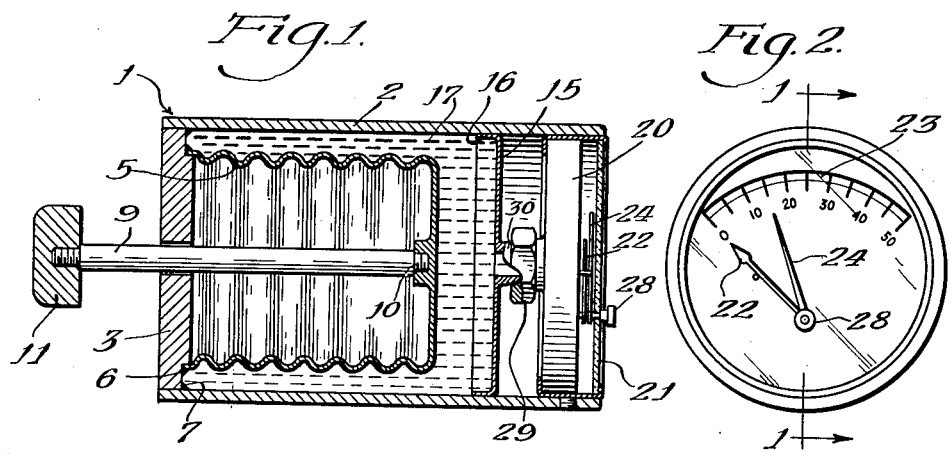
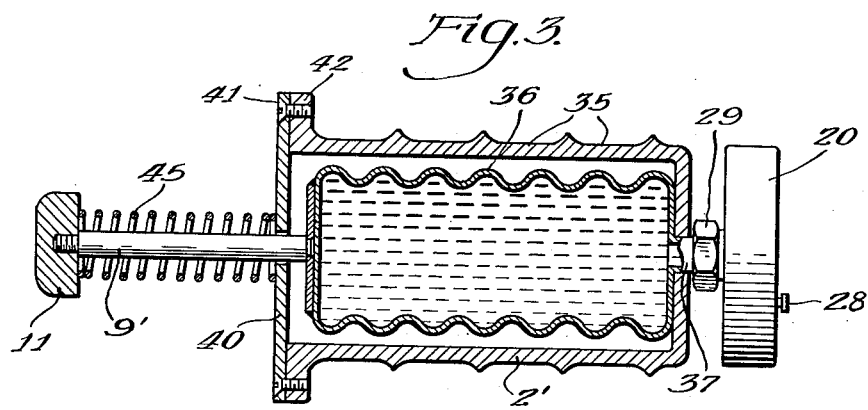
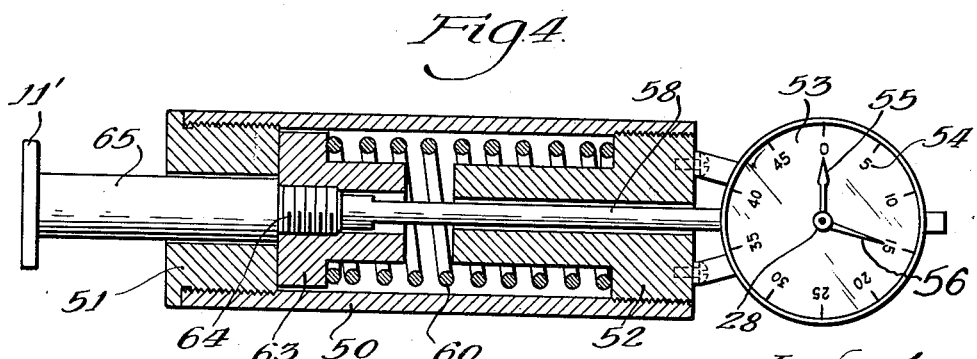
Inventor:
Louis B. Newman
By: Morris Spector
Attorney Patented June 15, 1954

2,680,967

UNITED STATES PATENT OFFICE 2,680,967

APPARATUS FOR MEASURING MUSCLE STRENGTH

Louis B. Newman, Chicago, Ill.

Application September 4, 1948, Serial No. 47,777

2 Claims. (Cl. 73—379)

This invention relates to an apparatus for measuring muscle strength.

In the treatment of conditions involving impairment of muscles, such as muscles of the legs, arms, fingers, etc., it is frequently desirable to know the rate of increase in muscle strength over periods of time. Usually the physician relies upon his memory of the patient's muscular strength in the afflicted muscle during the past treatment or treatments and tries to judge whether or not the muscles are being strengthened, and the extent thereof.

It is one of the objects of the present invention to provide a device of a simple construction which a physician or therapist may use to cause the patient to push or pull against and which device will measure the maximum force that the patient can exert. Recorded data of these measurements will serve as a record of the change in muscular strength of the muscles involved.

In accordance with the principles of the present invention there is provided a simple device which the physician can hold in the palm of his hand and by pushing against the device cause the device to push against the patient's finger, arm or leg involving the afflicted muscle. Upon instructions, the patient resists the physician's push as long as he can. When the limit of the patient's resistance is reached the afflicted limb drops back and at the same time the physician has a record on the instrument which is a measure of the amount of force that was required to force the afflicted muscle back.

In order to use the same device to measure the strength of muscles that may vary greatly in power and in order to secure accurate readings, the device may be provided to receive springs of varying tension which can be added to the device, or substituted one for another, so that under one condition the numerical calibration of the scale of the gauge may be in terms of one unit, such as pounds, and under another condition it may be in terms of a smaller unit, such as ounces, or other fractional parts of a pound.

The physician in testing the patient's muscle or group of muscles can push the device against the extremity that is being or should be activated by the afflicted muscle and have the patient resist the physician's thrust until the physician's thrust overcomes the resistance of the patient. The maximum reading on the gauge is the maximum resistance offered to the physician by the patient's thrust and is a function of the muscle's strength. It is also possible to use the device of the present invention in a somewhat different manner to accomplish the same result. For instance, the resistance measuring device or gauge may be fixed in a frame or bracket and the patient then exerts a muscular force against the member that is connected with the device.

In accordance with the principles of the present invention the muscle strength measuring device can also be used in connection with the pull method for determining the pulling strength of a muscle or group of muscles. A cuff is placed on the limb or other part of the body that is moved by the muscle involved and the patient transmits his muscular pull to the device through the cuff. Either the push or pull method of determining muscular strength can be used in connection with the device of the present invention to measure the strength of a single muscle or group of muscles that controls the movement of any external part of the body, including the head, the neck, the torso, the arms, the legs, the fingers, etc.

One of the advantages of the present invention is that it enables the physician to measure the patient's muscular strength before treatment is instituted so that the physician is able to evaluate the benefits of the treatment for the purposes involved.

A further object of the present invention is to provide a device of the above mentioned character which is simple and economical of construction and reliable in its action. It is a still further object of the present invention to provide a device of the above mentioned character wherein the readings of the maximum force of the muscle or group of muscles involved may be made directly or at a remote point.

The attainment of the above and further objects of the present invention will be apparent from the following specification taken in conjunction with the accompanying drawing forming a part thereof.

In the drawing:

Figure 1 is a longitudinal sectional view through a device embodying the present invention;

Figure 2 is a right hand view of the device of Figure 1;

Fig. 3 is a longitudinal sectional view illustrating a modified construction; and Figure 4 is a longitudinal sectional view through still another embodiment of the present invention, the gauge at the end thereof being shown in elevation.

Reference may now be had more particularly to the drawing wherein like reference numerals designate like parts throughout.

The measuring device of Figure 1, indicated in general by the reference numeral 1, comprises a metal cylinder 2 of a size such that it can conveniently be grasped by the hand. The cylinder is closed at one end by a circular plate 3 that has an expansible metal bellows 5, welded or otherwise secured to the inner surface of the plate 3 as, for instance, by a line of weld 6 that extends around the entire periphery of the bellows and makes an air-tight, liquid-tight seal with the plate 3. The plate 3 in turn is welded to the cylinder 2 as by a line of weld 7 that extends around the entire circumference of the plate 3 and provides a liquid-tight seal between the plate and the cylinder 2. A rod 9 is slidable through the plate 3 making a sufficiently loose fit therewith to permit the free flow of air from one side to the other side of the plate 3. The end 10 of the rod 9 is screw threaded to the bellows 5 at the center thereof, and the opposite end of the rod 9 has a pressure knob 11 threaded thereon. A circular closure plate 15 is welded to the inside of the cylinder 2 to make a liquid-tight seal therewith, the plate having a flange 16 for facilitating this action. The space on the inside of the cylinder 2 between the bellows 5 and the plate 15 is filled with a liquid, generally an oil, such as is used in expansion bellows.

A standard fluid pressure gauge 20 is mounted in the end of the cylinder 2 opposite the closure plate 3. The gauge includes the usual glass closure 21, a pressure actuated indicating pointer 22, and a calibrated scale 23. In addition the gauge includes the usual follower pointer 24 that is actuated by the pointer 22 as the pointer 22 moves from zero towards the opposite end of the scale, said follower 24 remaining in the furthest position in which it was pushed by the pointer 22 even after the pointer 22 recedes from its maximum position. The follower pointer 24 is returned to its initial position by a knob 28 that extends through the glass plate 21 and is secured to the follower pointer 24. The Bourdon tube of the pressure gauge 20 is connected to the pressure chamber 17 by a connection 29 that threads onto a nipple 30 formed at the center of the circular closure plate 15 so that the pressure within the pressure chamber 17 is communicated to the gauge 20 to actuate the pointer 22 thereof.

The structure thus far described is very compact. The physician grips the measuring device 1 by embracing the cylindrical casing 2 with one hand. If the physician is to use this device to measure the strength of the muscles controlling a finger of a patient, the physician, holding the cylinder 2 in one hand, presses the knob 11 against the finger of the patient and asks the patient to resist the push of the knob as the physician pushes the device 1 more and more firmly against the finger of the patient. As long as the patient is resisting the pressure of the knob 11 there is a consequent rise of pressure of fluid in the chamber 17 and this rise of pressure is measured by the pressure gauge 20, the pointer 22 moving across the scale 23. When the patient can no longer resist the pressure his finger drops and the pressure within the pressure chamber 17 immediately drops to zero. In the meantime the pointer 22 has moved the follower pointer 24 to a position indicating the maximum pressure that was attained. The physician can then in a very simple manner read the maximum pressure which is determined by the position of the follower pointer 24. Thereafter the physician resets the follower pointer to a zero position and the instrument is ready for its next use.

The structure shown in Figure 3 is in principle the same as that of Figure 1. In that structure a cup-shaped casing 2', which corresponds functionally to the cylinder 2, has a number of finger grooves 35 each extending entirely or partially around the casing 2' to facilitate gripping of the casing by the physician. A metal bellows 36 is mounted on the inside of the cup-shaped casing, said bellows having a neck 37 that extends through the back of the casing and on which is mounted a pressure gauge 20 which is identical in construction with that of the pressure gauge 20 previously described. A coupling nut 29 couples the gauge 20 with the neck 37 of the bellows for communicating the pressure within the bellows to the pressure gauge 20. A circular cover plate 40 closes the opposite end of the casing 2' being secured thereto in any desired manner as, for instance, by a series of countersunk screws 41 that thread into a peripheral flange 42 of the cup-shaped casing. The rod 9', that corresponds with the rod 9 of Figure 1, is secured at one end to the bellows 36. At the other end the rod has the knob 11 threaded thereon. A calibrated compression spring 45 is provided between the knob 11 and the cover plate 40.

The device of Figure 3 is used in exactly the same manner as is the device of Figure 1. The spring 45 performs the definite function of permitting changing of the scale readings as may be required when dealing with muscles of different strengths. For instance, with the spring 45 in position the device may be used to measure muscular strength of comparatively strong muscles, the gauge being calibrated so that the numbers on the dial of the gauge indicate, for instance, pounds of pressure. If it is desired to use the same device for testing a comparatively weak muscle, where the total pressure exerted by the patient may be only one pound or a fraction of a pound, the spring 45 may be removed, in which case a small pressure on the knob 11 will produce as large a movement of the pressure gauge pointer as would have been produced by a large pressure had the spring 45 been in place. The spring is a calibrated spring so that with the spring in place the readings on the dial designate pounds of pressure and with the spring removed the readings on the dial designate ounces of pressure. By using different calibrated springs for the spring 45 the physician may obtain large and therefore more accurately determined readings even though the patient's exertable pressure is very small.

In Figure 4 there is illustrated still another embodiment of the present invention wherein instead of pressure bellows, only a spring is used. In this structure, as in the structure previously described, the size of the device is such that it may be readily gripped by the hand of a physician. The structure includes a cylindrical casing 50 internally threaded at each end and closed at each end by closure plugs 51 and 52. A contour gauge 53 is mounted on the closure plug 52, said gauge having a scale 54 and a pointer 55 and a follower pointer 56 that reads the maximum position of the pointer 55, the pointer 56 being reset by a manually operable knob 28 the same as was heretofore described in connection with Figure 2. An actuating plunger 58 extends from the gauge through the plug 52, being slidable therein. A spring 60 within the cylinder 50 bears at one end against the plug 52 and at its other end bears against a longitudinally movable head 63 that has threaded therein a threaded shank 64 at the end of a rod 65 that is slidable through the plug 51. The end of the shank 64 bears against the end of the actuating plunger 58. The rod 65 has a knob 11' at the end thereof which knob corresponds functionally with the knob 11 previously described. When the cylinder 50 is held in one hand a pressure against the knob 11 forces the rod 65 inwardly of the cylinder and thus forces the head 63 inwardly by an amount determined by the pressure exerted and the stiffness of the calibrated spring 60. The longitudinal movement of the actuating plunger 58 is transmitted to the pointer 55 which thus moves across the scale 54 and also moves the pointer 56 to a position corresponding to the maximum position reached by the pointer 55. If it is desired to change the calibration of the gauge 53 it is merely necessary to replace the spring 60 by another calibrated spring of greater or lesser stiffness. Also, if desired, an additional calibrated spring, corresponding to the spring 45, may be added between the plug 51 and the knob 11'.

A calibrated spring, such as the spring 45, may be added to the structure of Figure 1 in a simple manner as, for instance, by unscrewing the knob 11 and then slipping the spring over the rod 9 and then replacing the knob.

While I have herein spoken essentially of an instrument wherein the actuation is obtained by pressure, it is, of course, obvious that the instruments herein shown may be used to measure a pull instead of a push. Also, if desired, the pressure of the fluid in the bellows of Figures 1 and 3 may be transmitted by means of a tube to a direct reading or recording gauge at a point remote from the instrument itself.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A device for measuring muscle strength comprising a tubular casing adapted to be held in the hand, a closure hermetically sealing one end of the casing, said closure including a pressure gauge having an indicator face or dial exposed on the outside of the casing, a second closure for the opposite end of the casing, an expansible bellows member within the casing and comprising a sleeve extending from said second closure into the casing, said bellows together with the casing wall and the first closure constituting a pressure chamber communicating with said gauge, a fluid within the chamber for communicating the chamber pressure to said gauge, a plunger slidable through said second closure and into the sleeve formed by the bellows and bearing on the end of the bellows remote from the second closure for actuating the bellows, and means on the portion of the plunger outside the casing for actuating the same.

2. A device for measuring muscle strength comprising an open ended tubular casing, a closure overlying and closing one open end of the casing, said closure including a pressure gauge telescoping into the casing and having an indicator face or dial extending across said open end of the casing and exposed on the outside of the casing, a second closure for the opposite end of the casing, means forming a pressure developing expansible bellows chamber within the casing and comprising a contractible and expansible bellows member forming a wall of said chamber in the casing, said bellows pressure chamber communicating with said gauge, a liquid filling the chamber for communicating the chamber pressure to said gauge, a plunger slidable through said second closure and bearing on the contractible and expansible member for actuating the collapsible and expansible member, and means on the portion of the plunger outside the casing for actuating the same.

References Cited in the file of this patent

UNITED STATES PATENTS

| Number | Name | Date |
|---|---|---|
| 1,018,582 | Nelson | Feb. 27, 1912 |
| 1,559,921 | Treuheit | Nov. 3, 1925 |
| 1,817,315 | Knapp | Aug. 4, 1931 |
| 1,892,088 | Wahl | Dec. 27, 1932 |
| 2,039,337 | Nolan | May 5, 1936 |
| 2,450,188 | Graff | Sept. 28, 1948 |

FOREIGN PATENTS

| Number | Country | Date |
|---|---|---|
| 565,314 | France | Nov. 6, 1923 |